United States Patent [19]

Kitajima et al.

[11] Patent Number: 5,507,424
[45] Date of Patent: Apr. 16, 1996

[54] INTEGRATED CAPSTAN AND MOTOR

[75] Inventors: Kimio Kitajima; Noboru Ashibe, both of Nagano, Japan

[73] Assignee: Kabushiki Kaisha Sankyo Seiki Seisakusho, Tokyo, Japan

[21] Appl. No.: 253,861

[22] Filed: Jun. 3, 1994

[30] Foreign Application Priority Data

Jun. 3, 1993 [JP] Japan ................................. 5-034871 U
Jun. 3, 1993 [JP] Japan ................................. 5-034872 U

[51] Int. Cl.6 ................................................. B65H 20/02
[52] U.S. Cl. ........................... 226/188; 226/194; 242/354
[58] Field of Search ................................. 226/182, 181,
226/187, 190, 196, 193, 188, 191, 192,
194; 242/418, 338, 340, 354

[56] References Cited

U.S. PATENT DOCUMENTS 3,093,330  6/1963  Schmidt ................................. 242/418
3,900,174  8/1975  Morimoto et al. ..................... 242/209
4,122,985  10/1978  Nelson .................................... 226/181
4,212,436  7/1980  Schoettle et al. ....................... 242/192

FOREIGN PATENT DOCUMENTS 926558  10/1947  France .................................... 226/182
291236  10/1971  U.S.S.R. ................................. 226/181

Primary Examiner—John M. Jillions
Attorney, Agent, or Firm—Sughrue, Mion, Zinn, Macpeak & Seas

[57] ABSTRACT

A magnetic tape drive device includes coils wound about a stator core secured to a base board; a rotor case containing a drive magnet secured to the inner surface thereof, the drive magnet being disposed facing the stator core; and a drive member for transmitting the rotation of rotor case to a roller, the drive member positioned on an outer peripheral surface of the rotor case.

8 Claims, 6 Drawing Sheets

INTEGRATED CAPSTAN AND MOTOR

BACKGROUND OF THE INVENTION

1. Field of the Invention

The present invention relates to a magnetic tape drive device, and more particularly to a magnetic tape drive device for driving a magnetic tape of the cartridge type with a capstan to run.

2. Related art

A conventional magnetic tape drive device M, as shown in FIGS. 9A and 9B, includes a rotor case 3, shaped like a tube with the bottom, and a stator core 5. The rotor case 3 is coupled with one end portion of a rotary shaft 1 by means of a bracket 2. A drive magnet 3a is secured to the inner surface of the rotor case 3. The stator core 5, secured to a base board 4, is wound by coils 5a, which is disposed facing the drive magnet 3a. Current flowing through the coil 5a and a magnetic field developed by the drive magnet 3a cooperate to turn the rotary shaft 1 together with the rotor case 3. A rubber roller 7 is fastened to the other end of the rotary shaft 1 protruded from the base board 4, with a spacer 6 intervening therebetween. The rubber roller 7 is brought into contact with a capstan roller 9 of a tape cartridge 8. With this structure, when the rotary shaft 1 is turned, the capstan roller 9 is turned.

In the magnetic tape drive device M thus constructed, many parts are required for constructing a mechanism for transmitting a turning effect of the rotary shaft to the capstan roller 9. This increases the cost to manufacture. Further, the required height h of the magnetic tape drive device hinders the thinning of the whole device.

With the structure of fastening the rubber roller 7 to the rotary shaft 1 of a small diameter, an efficient transmission of the torque of the rotary shaft 1 to the capstan roller 9 in a state that a load to the rotary shaft 1 is minimized, inevitably requires reduction of the diameter of the rubber roller 7.

As the result of the diameter reduction of the rubber roller, a contact area of the rubber roller 7 with the capstan roller 9 is reduced. A slip tends to occur in the relative motion of the rubber roller to the capstan roller. To cope with this, approach to increase a contact force is allowed. In the approach, a side pressure to the rotary shaft 1 (pressure acting in the direction orthogonal to the axial line) increases, so that the torque transmission is inefficient. Thus, a proper setting of the contact pressure is difficult, making the assembling work difficult and inefficient.

SUMMARY OF THE INVENTION

Accordingly, an object to the present invention is to provide a magnetic tape drive device which can realize cost reduction by decreasing the number of required parts, can thin the whole device, and allows a proper contact pressure of the rollers to easily be set.

To achieve the above object, there is provided a magnetic tape drive device comprising: coils wound about a stator core secured to a base board; a rotor case containing a drive magnet secured to the inner surface thereof, the drive magnet being disposed facing the stator core; and a drive roller, secured to the outer surface of the rotor case, being brought into contact with a capstan roller, rotatably provided in a tape cartridge, for running a tap, wherein current flowing through the coils and a magnetic field developed by the drive magnet cooperate to turn the rotor case, and a turning effect of the rotor case is directly transmitted to the capstan roller.

With such a construction, coils are wound about a stator core secured to a base board. A rotor case contains a drive magnet secured to the inner surface thereof, and the drive magnet is disposed facing the stator core. A rubber roller is secured to the outer surface of the rotor case in a state that the rubber roller is in contact with a capstan roller, rotatably provided in a tape cartridge, for running a tape. Current flowing through the coils and a magnetic field developed by the drive magnet cooperate to turn the rotor case, and a turning effect of the rotor case is directly transmitted to the capstan roller.

DETAILED DESCRIPTION OF THE PREFERRED EMBODIMENTS

The preferred embodiments of a magnetic tape drive device according to the present invention will be described with reference to the accompanying drawings.

First Embodiment

Figure 1:
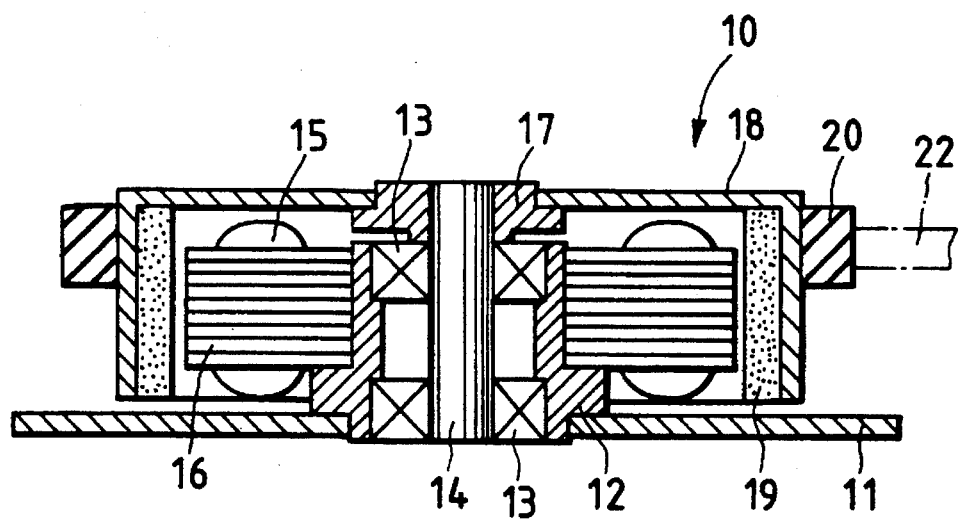
FIG. 1 is a longitudinal sectional view showing a first embodiment of a magnetic tape drive device according to the present invention.
Figure 2A:
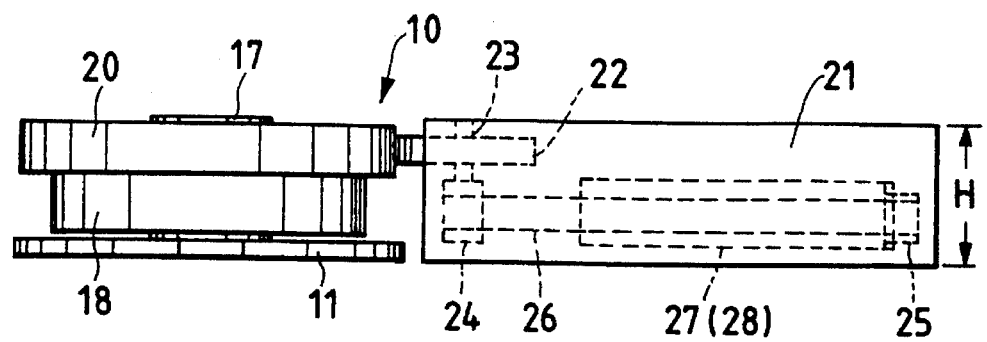
FIG. 2(A) is a side view of the magnetic tape drive device of FIG. 1.

As shown in FIGS. 1, 2(A) and (B) showing a first embodiment of the present invention, a magnetic tape drive device 10 is comprised of a rotary shaft 14, a stator core 16, a rotor case 18, a drive magnet 19, and a drive roller 20. The rotary shaft 14 is rotatably supported by bearings 13 within a bearing holder 12 secured to a base board 11. The stator core 16 having salient poles wound by coils 15 is secured to the outer surface of the bearing holder 12. The rotor case 18 shaped like a tube with the bottom is coupled with the rotary shaft 14 by a bracket 17. The drive magnet 19, secured to the inner surface of the rotor case 18, is disposed facing the stator core 16. The drive roller 20 is secured to the outer surface of the rotor case 18.

The rubber roller as the drive roller is shaped like a ring and made of urethane rubber or silicon rubber. The rubber roller is bonded to the circumferential-outer surface of the rotor case 18 by adhesive, for example. Then, the circumferential outer surface is polished for securing a required accuracy on its swing motion, for example. The rubber roller 20 is brought into contact with a capstan roller 22 of a tape cartridge 21 to directly transmit a turning effect of the rotor case 18 to the capstan roller 22.

The capstan roller 22 is coupled with a drive pulley 24 through a shaft 23. Reels 27 and 28 are turned by a back drive of an endless belt 26 stretched among the drive pulley 24 and a pair of follower pulleys 25 and 25. With the turn of the reels, a magnetic tape (not shown) wound about the reels 27 and 28 travels along a magnetic head 29.

Figure 2B:
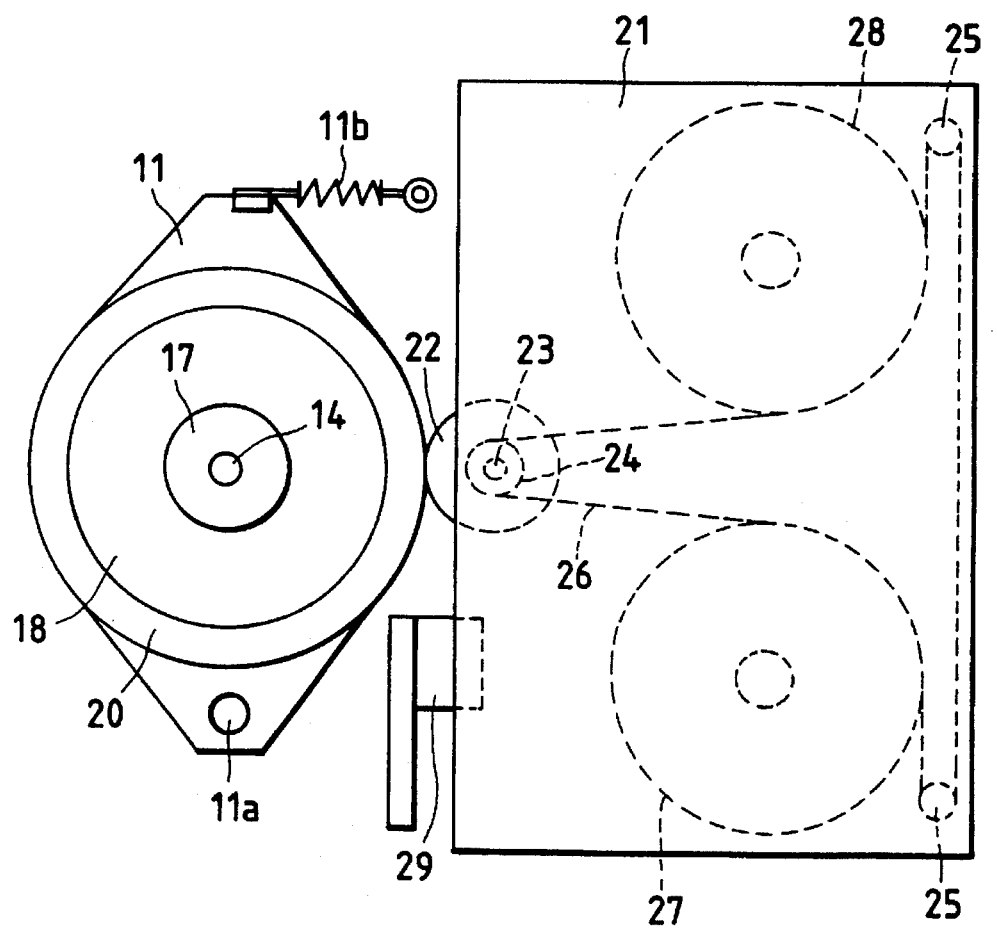
FIG. 2(B) is a plan view showing the magnetic tape drive device of FIG. 1.

The base board 11, as shown in FIG. 2(B), is rotatably supported by a shaft 11a fastened to a device body, not shown. The base board 11 is also coupled with one end of a spring 11b coupled at the other end with the device body. The base board 11 is turned about the shaft 11a by the spring 11b, to urge the rubber roller 20 against the capstan roller 22 at a proper pressure.

In the magnetic tape drive device thus constructed, current flowing through the coils 15 and a magnetic field developed by the drive magnet 19 cooperate to turn the rotor case 18 about the rotary shaft 14. At the same time, the rubber roller 20 secured to the rotor case 18 turns the capstan roller 22.

With provision of the rubber roller 20 on the circumferential outer surface of the rotor case 18, the capstan roller 22 can be turned without any portion protruded from the rotor case 18 on the rotary shaft 14. Therefore, the height h of the device can be reduced, leading to reduction of the device thickness. Further, since the diameter of the rubber roller 20 is large, a large contact area of the rubber roller and the capstan roller 22 is secured.

Therefore, if a contact pressure of those rollers is set low, no slip takes place in the relative motion of them. The side pressure to the rotary shaft 14 is also reduced, lessening the torque loss. Thus, the magnetic tape drive device of the invention can easily be assembled, and a required torque transmission efficiency can also be secured easily.

Second Embodiment

Figure 3:
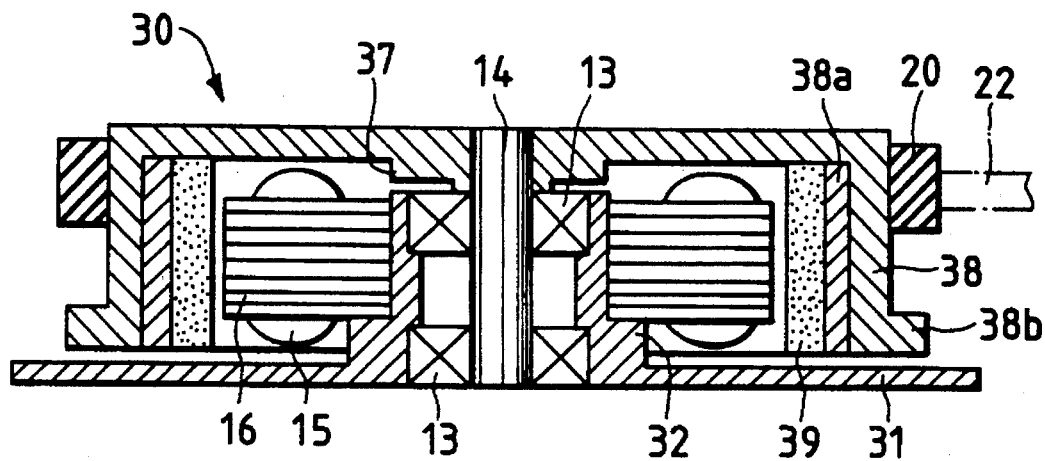
FIG. 3 is a longitudinal sectional view showing a second embodiment of a magnetic tape drive device according to the present invention.

A second embodiment of a magnetic tape drive device according to the present invention is illustrated in FIG. 3. In this embodiment, as shown, a base board 31 of a magnetic tape drive device 30 is integral with a bearing holder 32, and a rotor case 38 is integral with a bracket 37. An intermediate yoke 38a is placed between a drive magnet 39 and the inner surface of the rotor case 38, thereby improving its strength against the side pressure. A collar 38b extended from the outer surface of the rotor case 38, is also integral with the latter, so that the structure is further strengthened. In FIG. 3, like reference numerals designate like or equivalent portions in the figures for the first embodiment, and description on those portions are omitted for simplicity.

Third Embodiment

Figure 4:
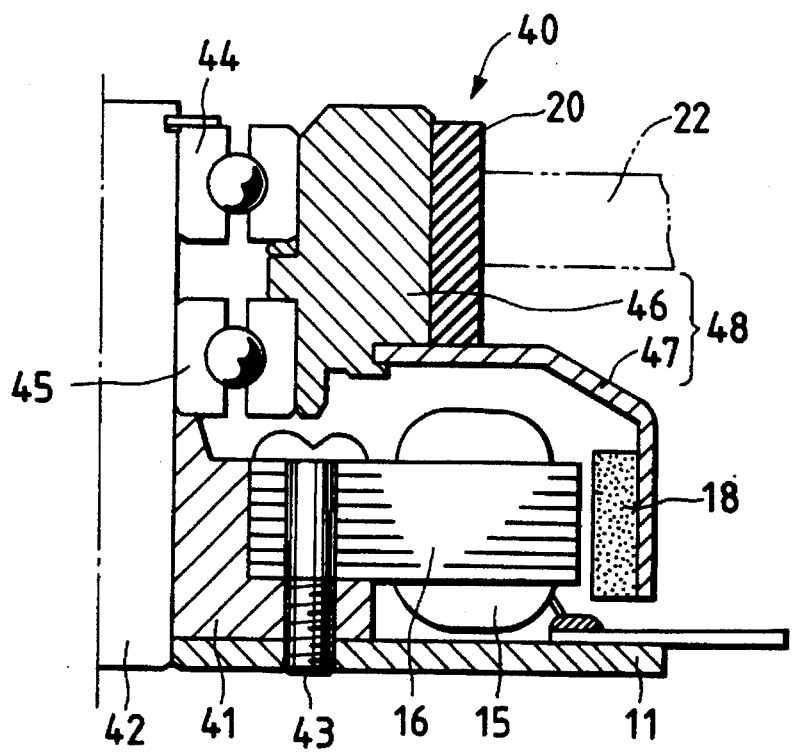
FIG. 4 is a partly longitudinal sectional view showing a third embodiment of a magnetic tape drive device according to the present invention.

FIG. 4 shows a third embodiment of the present invention. In this embodiment, a motor of the fixed shaft type is used for the magnetic tape drive device, and a rubber roller is provided on the outer surface of a rotor case of the motor. To be more specific, a magnetic tape drive device 40 is comprised of a fixed shaft 42, a stator core 16, a rotor hub 46, a rotor yoke 47, a drive magnet 18, and a rubber roller 20. The fixed shaft 42, shaped like a pole, is firmly planted in a center hole of a holder 41 fastened to a base board 11, by a shrinkage fitting method, for example. The stator core 16 is provided with salient poles wound by coils 15. The inner surface of the stator core 16, together with the holder 41, is secured to the base board 11 by means of a screw 43. The rotor hub 46 is rotatably held by the outer surface of the fixed shaft 42, through a pair of ball bearings 44 and 45 (as bearings) inserted therebetween. The rotor yoke 47, shaped like a cup, is coupled with the bottom end of the rotor hub 46. The drive magnet 18 is secured to the inner surface of the rotor yoke 47, while facing the stator core 16. The rubber roller 20 is secured to the outer surface of the rotor hub 46.

The rotor hub 46 and the rotor yoke 47 form a rotor case 48. Current flowing through the coils 15 and a magnetic field developed by the drive magnet 19 cooperate to turn the rotor case 48 about the fixed shaft 42. The rubber roller 20 integral with the rotor hub 46 of the rotor case 48 turns the capstan roller 22 as in the first and second embodiments. The diameter of the rubber roller 20 is larger so that a large contact area of it with the capstan roller 22 is secured and a contact pressure of them may be set low, as in the first and second embodiments.

Fourth Embodiment

A fourth embodiment of a magnetic tape drive device according to the present invention will be described with reference to the accompanying drawings.

Figure 5:
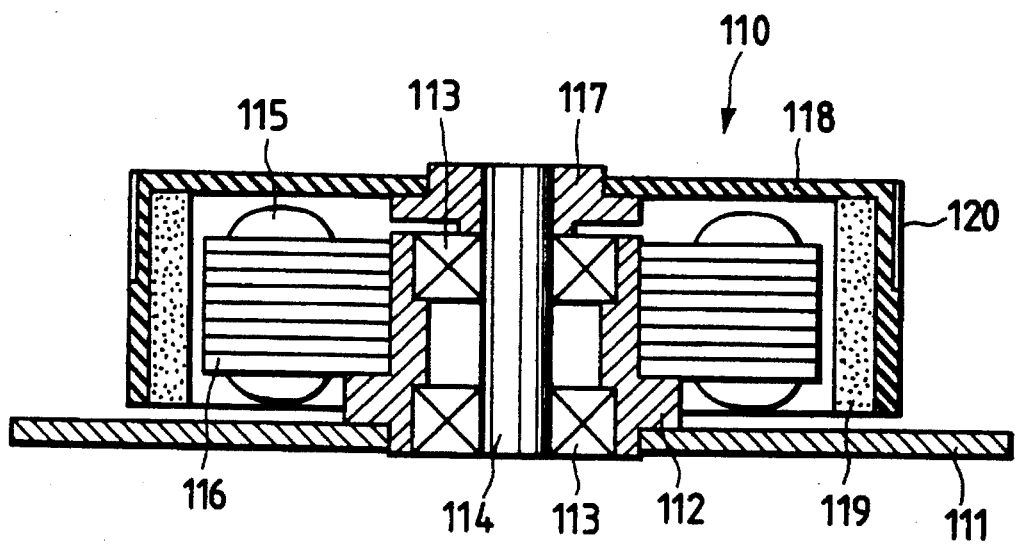
FIG. 5 is a longitudinal sectional view showing a fourth embodiment of a magnetic tape drive device according to the present invention.
Figure 6A:
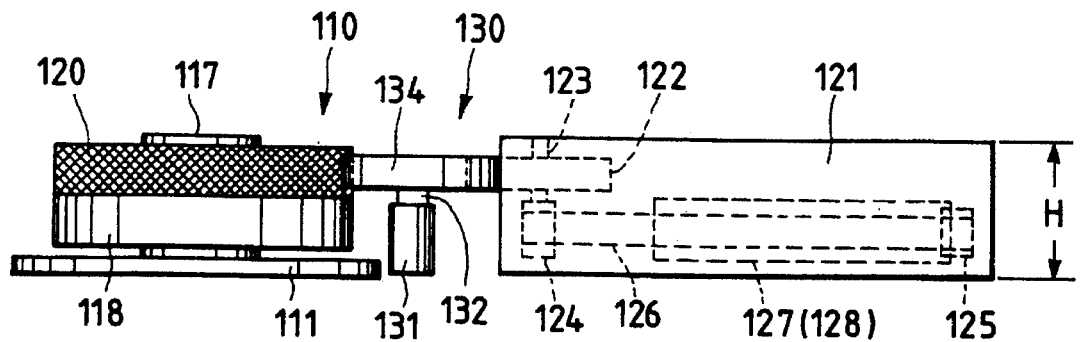
FIG. 6(A) is a side view of the magnetic tape drive device of FIG. 5.
Figure 6B:
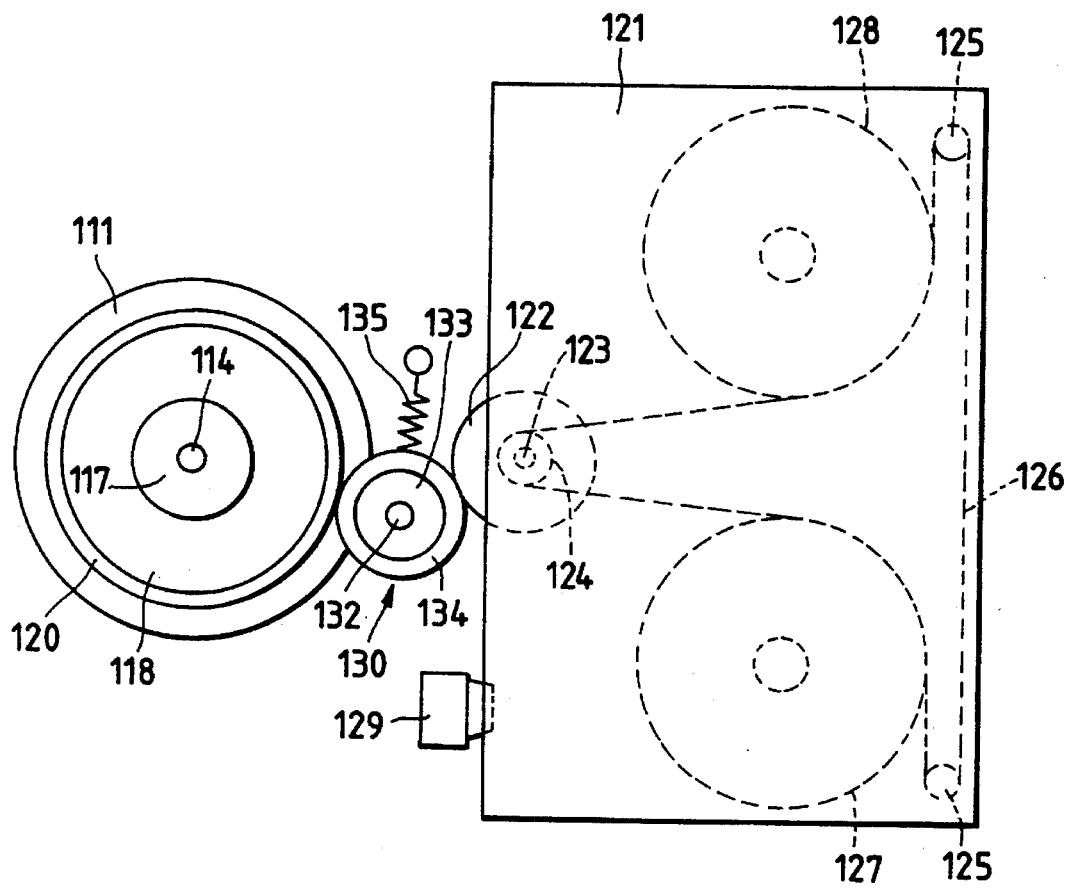
FIG. 6(B) is a plan view showing the magnetic tape drive device of FIG. 5.

As shown in FIGS. 5, 6(A) and (B) showing the fourth embodiment of the present invention, a magnetic tape drive device 110 is comprised of a rotary shaft 114, a stator core 116, a rotor case 118, a drive magnet 119, and a drive roller 120. The rotary shaft 114 is rotatably supported by bearings 113 within a bearing holder 12 secured to a base board 111. The stator core 116 having salient poles wound by coils 115 is secured to the outer surface of the bearing holder 112. The rotor case 118 shaped like a tube with the bottom is coupled with the rotary shaft 114 by a bracket 117. The drive magnet 119, secured to the inner surface of the rotor case 118, is disposed facing the stator core 116. The drive roller 120 is secured to the outer surface of the rotor case 118.

The rubber roller 120 is shaped like a ring. The surface of the drive roller 120 is processed by suitable process to increase the coefficient of friction thereof, such as knurling, sandblasting, chemical polishing or the like. The rubber roller thus processed is fit to the circumferential outer surface of the rotor case 118. The rubber roller 120 is brought into contact, in the substantially the same plane, with a capstan roller 122 of a tape cartridge 121 through a follower idler means 130. In this state, a turning effect of the rotor case 118 is transmitted to the capstan roller 122.

The capstan roller 122 is coupled with a drive pulley 124 through a shaft 123. Reels 127 and 128 are turned by a back drive of an endless belt 126 stretched among the drive pulley 124 and a pair of follower pulleys 125 and 125. With the turn of the reels, a magnetic tape (not shown) wound about the reels 127 and 128 travels along a magnetic head 129.

The follower idler means 130 is comprised of a base 131 slidably supported by a device body, not shown, a rotary shaft 132 held by the base 131, a follower roller 134 secured to the rotary shaft 132 by a spacer 133 inserted therebetween, and a spring 135 stretched between the device body and the base 131 so as to urge the follower roller 134 against both the drive roller 120 and the capstan roller 122.

In the magnetic tape drive device thus constructed, current flowing through the coils 115 and a magnetic field developed by the drive magnet 119 cooperate to turn the rotor case 118 about the rotary shaft 114. At the same time, the rubber roller 120 secured to the rotor case 118 turns the capstan roller 122 in the substantially the same plane, through the follower roller 134.

Thus, in the magnetic tape drive device, the rubber roller 120 is provided on the circumferential outer surface of the rotor case 118, and a turning effect of the rotor case 118 is transmitted to the capstan roller 122 in the substantially same plane. With such a construction, the capstan roller 122 can be turned without forming any portion protruded from the rotor case 118 on the rotary shaft 14. Therefore, the height H of the device can be reduced, leading to reduction of the device thickness. Additionally, a large contact area of the rubber roller 120 and the capstan roller 122 is secured since the diameter of the rubber roller 120 is large.

Thus, the contact area is increased and the surface of the drive roller 120 is processed so as to have an increased coefficient of friction. For this reason, if a contact pressure of those rollers is set low, no slip takes place in the relative motion of them. The side pressure to the rotary shaft 14 is also reduced, lessening the torque loss. Accordingly, the magnetic tape drive device of the invention can easily be assembled, and a required torque transmission efficiency can also be secured easily.

Fifth Embodiment

Figure 7:
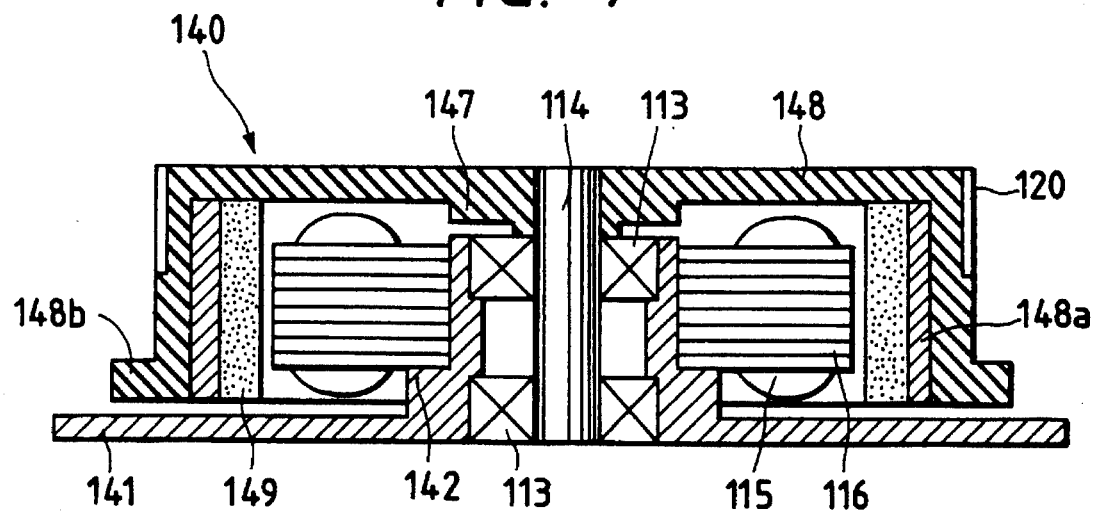
FIG. 7 is a longitudinal sectional view showing a fifth embodiment of a magnetic tape drive device according to the present invention.

A fifth embodiment of a magnetic tape drive device according to the present invention is illustrated in FIG. 7. In this embodiment, as shown, a base board 141 of a magnetic tape drive device 140 is integral with a bearing holder 142, and a rotor case 148 is integral with a bracket 147. An intermediate yoke 148a is placed between a drive magnet 149 and the inner surface of the rotor case 148, thereby improving its strength against the side pressure. A collar 148b extended from the outer surface of the rotor case 148, is also integral with the latter, so that the structure is further strengthened. In FIG. 7, like reference numerals designate like or equivalent portions in the figures for the fourth embodiment, and description on those portions are omitted for simplicity.

Sixth Embodiment

Figure 8:
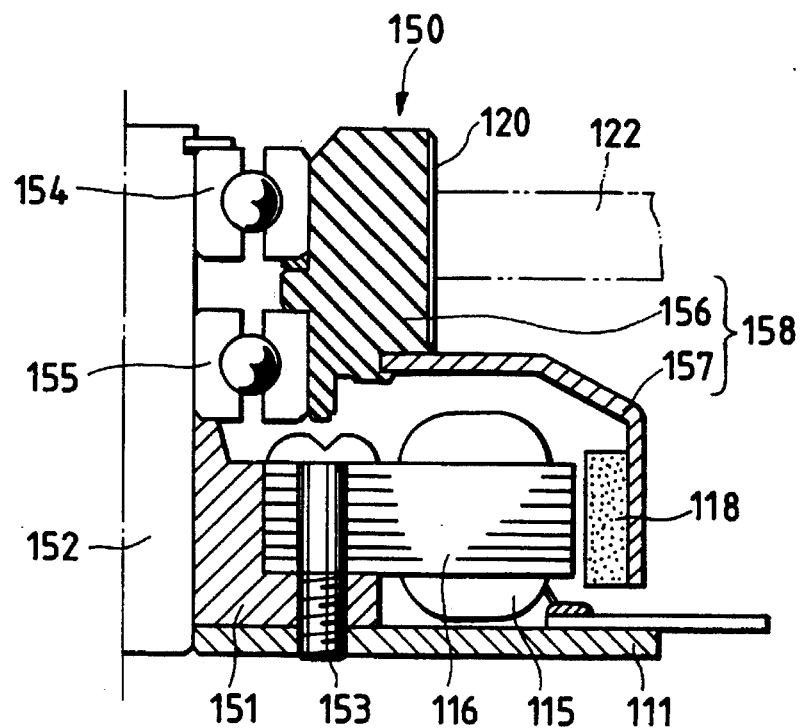
FIG. 8 is a partly longitudinal sectional view showing a sixth embodiment of a magnetic tape drive device according to the present invention.
Figure 9A:
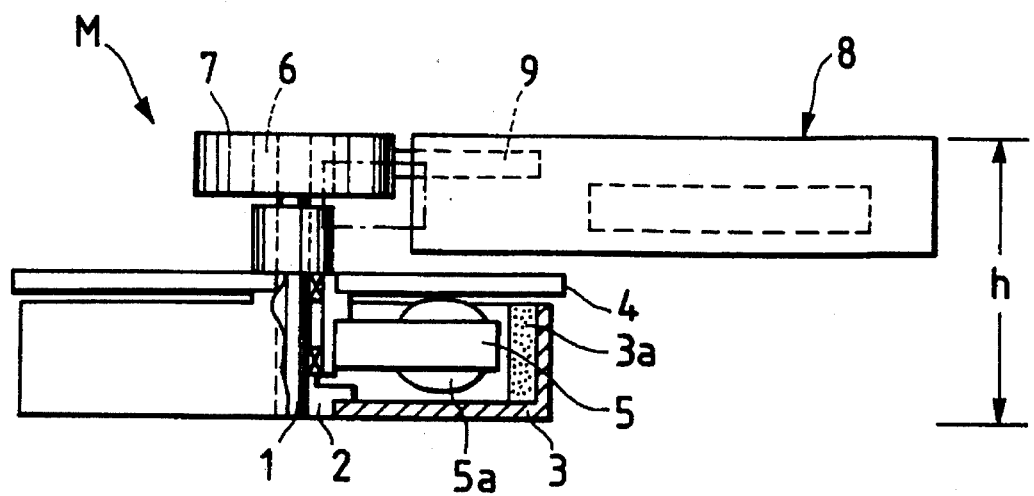
FIG. 9(A) is a side view, partly broken, showing a conventional magnetic tape drive device.
Figure 9B:
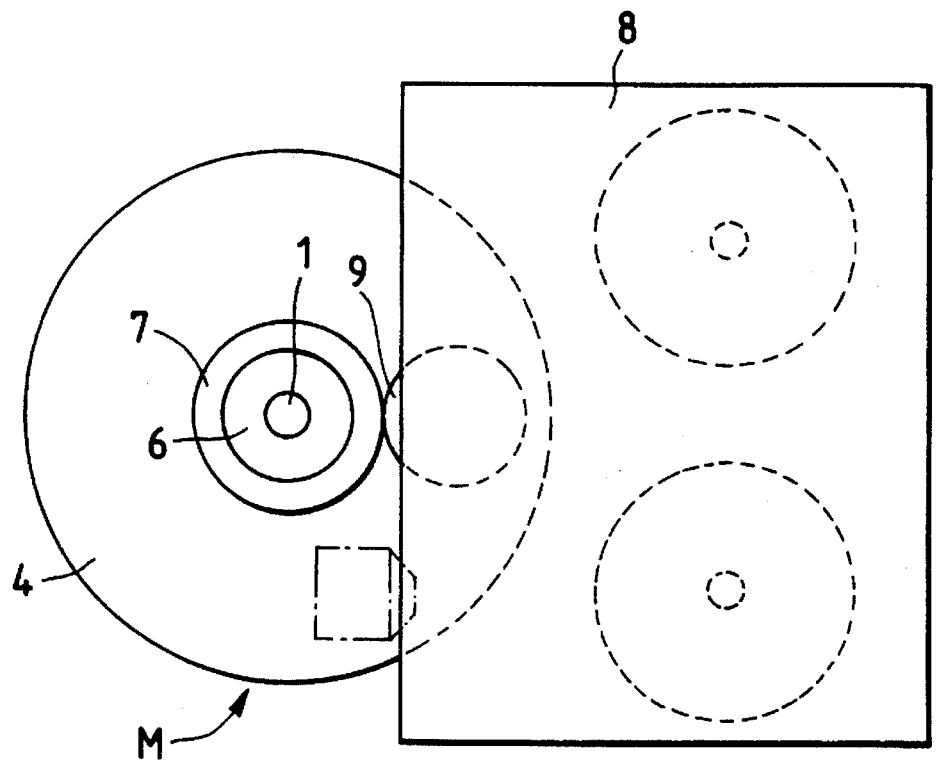
FIG. 9(B) is a plan view of the magnetic tape drive device shown in FIG. 9(A).

FIG. 8 shows a sixth embodiment of the present invention. In this embodiment, a motor of the fixed shaft type is used for the magnetic tape drive device, and a rubber roller is secured to the outer surface of a rotor case of the motor. To be more specific, a magnetic tape drive device 150 is comprised of a fixed shaft 152, a stator core 116, a rotor hub 156, a rotor yoke 157, a drive magnet 118, and a rubber roller 120. The fixed shaft 152, shaped like a pole, is firmly planted in a center hole of a holder 151 fastened to a base board 111, by a shrinkage fitting method, for example. The stator core 116 is provided with salient poles wound by coils 115. The inner surface of the stator core 116, together with the holder 151, is secured to the base board 111 by means of a screw 153. The rotor hub 156 is rotatably held by the outer surface of the fixed shaft 152, through a pair of ball bearings 154 and 155 (as bearings) inserted therebetween. The rotor yoke 157, shaped like a cup, is coupled with the outer surface of the bottom end of the rotor hub 156. The drive magnet 118 is secured to the inner surface of the rotor yoke 157, while facing the stator core 116. The rubber roller 120 is secured to the outer surface of the rotor hub 156.

The rotor hub 156 and the rotor yoke 157 form a rotor case 158. Current flowing through the coils 115 and a magnetic field developed by the drive magnet 119 cooperate to turn the rotor case 158 about the fixed shaft 152. The rubber roller 120 has an increased coefficient of friction by processing the surface of the rotor hub 156 by knurling, sandblasting, or the like. The drive roller 120 secured to the rotor hub 156 of the rotor case 158, turns the follower roller 134 as in the fourth and fifth embodiments. The diameter of the rubber roller 120 is large, so that a large contact area of it with the follower roller 134 is secured, a contact pressure of them may be set low, and no slip phenomenon takes place, as in the fourth and fifth embodiments.

As described above, a magnetic tape drive device of the invention comprises: coils wound about a stator core secured to a base board; a rotor case containing a drive magnet secured to the inner surface thereof, the drive magnet being disposed facing the stator core; and a drive roller, secured to the outer surface of the rotor case, being brought into contact with a capstan roller, rotatably provided in a tape cartridge, for running a tap, wherein current flowing through the coils and a magnetic field developed by the drive magnet cooperate to turn the rotor case, and a turning effect of the rotor case is directly transmitted to the capstan roller. The magnetic tape drive device thus constructed can realize cost reduction by decreasing the number of required parts, can thin the whole device, and allows a proper contact pressure of the rollers to easily be set.

Moreover, a magnetic tape drive device of the invention comprises: coils wound about a stator core secured to a base board; a rotor case containing a drive magnet secured to the inner surface thereof, the drive magnet being disposed facing the stator core; a drive roller secured to the outer surface of the rotor case, the surface of the drive roller being processed so as to have an increased coefficient of friction; and a follower roller being brought into contact, in the substantially same plane, with both the drive roller and a capstan roller, rotatably provided in a tape cartridge, for running a tape. The magnetic tape drive device thus constructed can realize the thinning of the whole device, and allows a proper contact pressure of the rollers to easily be set.

What is claimed is:

1. A drive device for driving a capstan roller for conveying a magnetic tape, comprising:

a base;

a stator core secured to said base and having coils wound therearound;

a rotor case including a drive magnet secured to the inner surface of said rotor case, the drive magnet being disposed facing the stator core, said rotor case being rotatable with respect to said base when said coils are energized; and a drive member for transmitting the rotation of said rotor case to the capstan roller, the drive member being positioned on an outer peripheral surface of said rotor case.

2. A magnetic tape drive device as claimed in claim 1, wherein said drive member comprises a rubber annular roller.

3. A magnetic tape drive device as claimed in claim 2, wherein said rubber roller directly contacts said capstan roller.

4. A magnetic tape drive device as claimed in claim 1, further comprising a follower roller interposed between said drive member and the capstan roller for transmitting the rotation of the rotor case from said drive member to the capstan roller.

5. A magnetic tape drive device as claimed in claim 1, further comprising:

an intermediate yoke disposed between the drive magnet and the inner surface of the rotor case, wherein the rotor case has a collar portion at the lower portion thereof.

6. A tape drive device for driving a capstan roller for conveying a magnetic tape, comprising:

a base;

a stator core secured to said base and having coils wound therearound;

a rotor case rotatably supported with respect to said base and substantially circumscribing said stator core, said rotor case including a drive magnet secured to an inner surface thereof facing said stator core, said rotor case being rotatable in response to energization of said coils, wherein an outer surface of said rotor case frictionally contacts the capstan roller so as to drive the capstan roller.

7. The tape drive device of claim 6, further comprising an idler roller interposed between said rotor case and the capstan roller so that rotation of said rotor case is transmitted to the capstan roller via the idler roller.

8. The tape drive device of claim 7, further comprising a spring for urging said idler roller toward said rotor case and the capstan roller so as to frictionally engage said rotor case and the capstan roller.

* * * * *